(12) United States Patent  
Gaster

(10) Patent No.: US 9,424,009 B2  
(45) Date of Patent: Aug. 23, 2016

(54) HANDLING POINTERS IN PROGRAM CODE IN A SYSTEM THAT SUPPORTS MULTIPLE ADDRESS SPACES

(71) Applicant: Advanced Micro Devices, Inc., Sunnyvale, CA (US)

(72) Inventor: Benedict R. Gaster, Santa Cruz, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/723,969

(22) Filed: May 28, 2015

(65) Prior Publication Data

US 2015/0261511 A1    Sep. 17, 2015

Related U.S. Application Data

(62) Division of application No. 13/632,902, filed on Oct. 1, 2012, now Pat. No. 9,058,192.

(60) Provisional application No. 61/681,245, filed on Aug. 9, 2012.

(51) Int. Cl.
  *G06F 9/45*   (2006.01)
  *G06F 9/44*   (2006.01)
  *G06F 11/36*  (2006.01)

(52) U.S. Cl.
  CPC   *G06F 8/434* (2013.01); *G06F 8/24* (2013.01); *G06F 8/42* (2013.01); *G06F 8/45* (2013.01); *G06F 9/44* (2013.01); *G06F 11/3636* (2013.01)

(58) Field of Classification Search
  CPC . G06F 12/0276; G06F 12/0866; G06F 8/434; G06F 9/30181; G06F 9/30094; G06F 9/328; G06F 12/0862; Y10S 707/99957; Y10S 707/99953

See application file for complete search history.

(56) References Cited

U.S. PATENT DOCUMENTS

| | | | | |
|---|---|---|---|---|
| 7,930,486 B2* | 4/2011 | Szonye | ............... | G06F 12/0875 711/137 |
| 8,141,099 B2* | 3/2012 | DeWitt, Jr. | .......... | G06F 9/30094 710/24 |
| 8,458,671 B1* | 6/2013 | Hostetter | ................ | G06F 8/434 717/131 |
| 8,601,456 B2* | 12/2013 | Duffy | ...................... | G06F 8/434 717/140 |

(Continued)

OTHER PUBLICATIONS

Burcea et al., Pointy: a hybrid pointer prefetcher for managed runtime systems, Sep. 2012, 10 pages.*

(Continued)

*Primary Examiner* — Thuy Dao  
(74) *Attorney, Agent, or Firm* — Park, Vaughan, Fleming & Dowler LLP

(57) ABSTRACT

Some embodiments include a processing subsystem that compiles program code to generate compiled program code. In these embodiments, while compiling the program code, the processing subsystem first identifies a pointer in the program code that points to an unspecified address space. The processing subsystem then analyzes at least a portion of the program code to determine one or more address spaces to which the pointer may point. Next, the processor updates metadata for the pointer to indicate the one or more address spaces to which the pointer may point, the metadata enabling a determination of an address space to which the pointer points during subsequent execution of the compiled program code.

12 Claims, 5 Drawing Sheets

(56) References Cited

U.S. PATENT DOCUMENTS 9,116,817 B2 * 8/2015 Meier .................. G06F 9/3836
2013/0283245 A1 * 10/2013 Black .................. G06F 9/44589
　　　　　　　　　　　　　　　　　　717/130

OTHER PUBLICATIONS

Lattner et al., Transparent pointer compression for linked data structures, Jun. 2005, 12 pages.*

* cited by examiner

HANDLING POINTERS IN PROGRAM CODE IN A SYSTEM THAT SUPPORTS MULTIPLE ADDRESS SPACES

RELATED APPLICATIONS

The instant application is a divisional of, and hereby claims priority to, pending U.S. patent application Ser. No. 13/632,902, which was filed on 1 Oct. 2012. The instant application further claims priority to U.S. provisional patent application No. 61/681,245, which was filed on 9 Aug. 2012, to which parent application Ser. No. 13/632,902 also claims priority. Both of these applications are incorporated by reference.

This application is related to pending U.S. patent application Ser. No. 13/296,967, titled "Computer System and Method for Compiling Program Code and Assigning Address Spaces," by the same inventor, which was filed on 15 Nov. 2011.

BACKGROUND

1. Field

The described embodiments relate to techniques for handling pointers in program code. More specifically, the described embodiments relate to a technique for handling pointers in program code in a system that supports multiple address spaces.

2. Related Art

Through the use of certain programming languages (e.g., OpenCL, OpenCL C++, CUDA, etc.), programmers are able to use secondary processors (e.g., graphics processing units (GPUs), additional central processing unit (CPUs), embedded processors, etc. for performing operations that historically have been performed by a CPU alone. For example, some of these programming languages enable a GPU to be used to offload certain types of operations from a CPU, thereby freeing the CPU to perform other operations.

Some of these programming languages include support for multiple disjoint address spaces that can be used to control accesses to explicitly-managed memories in the secondary processors that are furnished with such memories. For example, the OpenCL programming language includes separate global, local, constant, and private address spaces. Although these address spaces are useful for handling memory accesses, their use introduces significant limitations to the underlying programming languages. One such limitation is that pointers within program code must be expressly directed to a particular address space. Thus, for each pointer, a programmer is required to state an address space to which the pointer is directed.

The requirement that pointers be handled in this way means that composing program code in these programming languages can be difficult. For example, if different versions of a function are to be implemented with pointers to different address spaces, multiple versions of the same function would need to be implemented. As another example, the management of implicit pointers, such as a class's this pointer (in the programming languages that support the this pointer), can be difficult when the implicit pointer can be applied to multiple address spaces.

Further complicating this problem is the fact that some of these programming languages support a "generic" address space that is used to refer generally to an underlying set of specific address spaces. In such programming languages, upon encountering a pointer to the generic address space at runtime, the system is required to dynamically determine an actual address space for the pointer before proceeding with subsequent operations.

SUMMARY

Some embodiments include a compiler (e.g., compiler 302 in FIG. 3) that compiles program code to generate compiled program code. In these embodiments, while compiling the program code, the compiler first identifies a pointer in the program code that points to an unspecified address space. The compiler then analyzes at least a portion of the program code to determine one or more address spaces to which the pointer may point. Next, the compiler updates metadata for the pointer to indicate the one or more address spaces to which the pointer may point, the metadata enabling a determination of an address space to which the pointer points during subsequent execution of the compiled program code.

In some embodiments, the compiler adds one or more instructions to the compiled program code. During subsequent execution of the compiled program code, the instructions are used to determine an address space to which the pointer points based on the metadata and one or more runtime conditions.

In some embodiments, the compiler adds one or more additional instructions to the compiled program code. During subsequent execution of the compiled program code, the additional instructions use the pointer to access the determined address space to which the pointer points. In some embodiments, the additional instructions comprise: (1) a memory access instruction configured to access each address space to which the pointer may point (e.g., a memory access instruction for a private address space, a memory access instruction for a global address space, etc.), and (2) one or more conditional instructions that control which of the memory access instructions is used to access the determined address space using the pointer.

In some embodiments, when identifying the pointer in the program code that points to the unspecified address space, the compiler first finds the pointer in the program code. The compiler then attempts to resolve an address space to which the pointer points using information in the pointer. When an address space cannot be resolved for the pointer, the compiler identifies the pointer as pointing to an unspecified address space.

In some embodiments, identifying the pointer in the program code that points to the unspecified address space comprises at least one of: (1) identifying the pointer as pointing to a generic address space; or (2) identifying different instances of the pointer in the program code as pointing to two or more different address spaces.

In some embodiments, when analyzing at least the portion of the program code to determine one or more address spaces to which the pointer may point, the compiler can analyze the program code to determine one or more operations in which the pointer is used that indicate an address space to which the pointer may point. The compiler can additionally, or alternatively, analyze operations related to the operations in which the pointer is used that indicate an address space to which the pointer may point, the related operations not directly using the pointer.

In some embodiments, when updating metadata for the pointer to indicate the one or more address spaces to which the pointer may point, the compiler can update one or more values in the pointer to indicate the one or more address spaces and/or update metadata associated with the pointer, but separate from the pointer, to indicate the one or more address spaces.

Some embodiments include a secondary processing subsystem that handles pointers while executing program code. In these embodiments, while executing program code, the secondary processing subsystem first encounters a pointer in the program code that points to an unspecified address space, wherein the pointer includes metadata that indicates one or more address spaces to which the pointer may point. The secondary processing subsystem then determines an address space to which the pointer points based on the metadata and one or more runtime conditions.

In some embodiments, the secondary processing subsystem performs one or more subsequent operations using the pointer based on the determined address space. For example, the secondary processing subsystem can receive a set of possible memory accesses that comprises a separate memory access for each of the one or more address spaces to which the pointer may point. The secondary processing subsystem can then determine a memory access to be performed using the pointer from the set of possible memory accesses based on the determined address space. Next, the secondary processing subsystem can perform the determined memory access using the pointer.

In some embodiments, when determining the address space to which the pointer points based on the metadata and the one or more runtime conditions, the secondary processing subsystem collects information about the one or more runtime conditions, the information indicating at least one candidate address space to which the pointer may point. The secondary processing subsystem then uses the collected information and the metadata to determine an address space to which the pointer points.

In some embodiments, collecting the information about the one or more runtime conditions comprises collecting information from one of: (1) operations that use the pointer, and (2) operations related to operations that use the pointer that do not directly use the pointer.

BRIEF DESCRIPTION OF THE FIGURES

Throughout the figures and the description, like reference numerals refer to the same figure elements.

DETAILED DESCRIPTION

Figure 1:
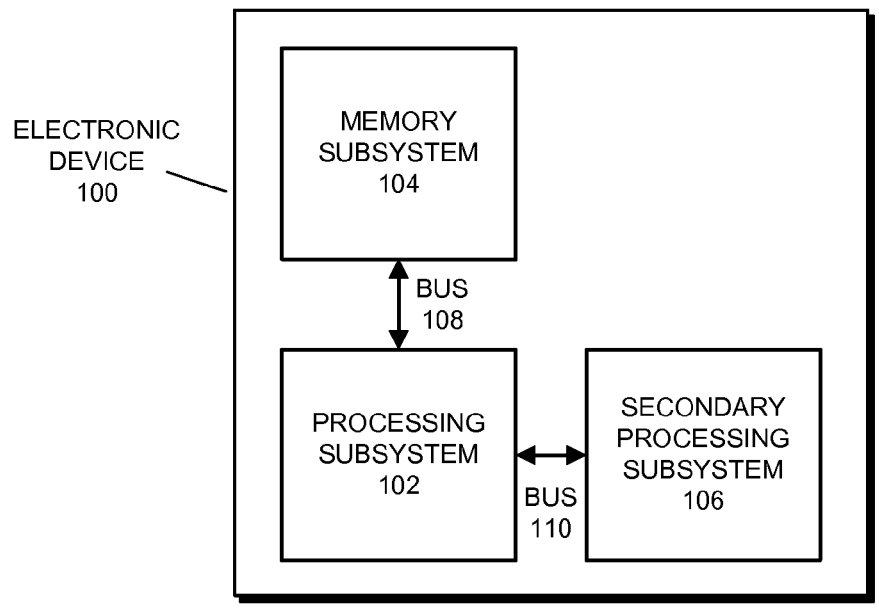
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, an electronic device with computing capabilities (e.g., electronic device 100 in FIG. 1) can use code and/or data stored on a computer-readable storage medium to perform some or all of the operations herein described. More specifically, the electronic device can read the code and/or data from the computer-readable storage medium and can execute the code and/or use the data when performing the described operations. For example, processing subsystem 102 can read program code for compiler 302 (see FIG. 3) from a computer-readable storage medium and can execute the program code for compiler 302 to perform a compilation operation to generate compiled program code 306 from program code 304. As another example, secondary processing subsystem 106 can read compiled program code 306 from a computer-readable storage medium and can execute compiled program code 306 to perform the operations of compiled program code 306.

A computer-readable storage medium can be any device or medium or combination thereof that can store code and/or data for use by an electronic device with computing capabilities. For example, the computer-readable storage medium can include, but is not limited to, volatile memory or non-volatile memory, including flash memory, random access memory (RAM, SRAM, DRAM, RDRAM, DDR/DDR2/DDR3 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores, application-specific integrated circuit (ASIC) chips, field-programmable gate arrays (FPGAs), embedded processors, graphics processors/cores, pipelines, and/or other programmable-logic devices. When such hardware modules are activated, the hardware modules can perform some or all of some operations. In some embodiments, the hardware modules include one or more general-purpose circuits that are configured by executing instructions (program code, firmware, etc.) to perform the operations.

Overview

Some embodiments include a compiler for compiling program code written in a programming language that supports using multiple disjoint address spaces to control accesses to memory. In these embodiments, as part of a compilation operation, the compiler can add information to compiled program code that can be used to determine an address space to which a pointer points. More specifically, while compiling program code, the compiler identifies a pointer in the program code for which an address space cannot be completely resolved at compile time (which can be referred to herein as a pointer to an "unspecified" address space). The compiler can then perform a syntactic analysis of at least some of the program code to determine one or more address spaces to which the pointer may point. Upon determining the address spaces to which the pointer may point, the compiler can update metadata associated with the pointer in the compiled program code to indicate the address spaces to which the pointer may point. In some embodiments, the compiler adds instructions to the compiled program code to enable the determination of the address space to which a given instance of the pointer points based on runtime conditions (and the metadata), and can add one or more additional instructions to the compiled program code for performing other operations based on the determined address space.

When the compiled program code is subsequently executed, e.g., by a secondary processing subsystem, the secondary processing subsystem can execute the instructions in the compiled program code to determine the address space to which a given instance of the pointer points based on runtime conditions and the metadata, and can execute the additional instructions for performing other operations based on the determined address space.

Electronic Device

FIG. 1 presents a block diagram illustrating an electronic device 100 in accordance with some embodiments. Generally, electronic device 100 can be any electronic device with computing capabilities that can perform the operations herein described. As can be seen in FIG. 1, electronic device 100 includes processing subsystem 102, memory subsystem 104, and secondary processing subsystem 106.

Processing subsystem 102 includes one or more devices, circuits, hardware modules, and/or computer-readable storage mediums configured for performing computational operations. For example, processing subsystem 102 can include, but is not limited to, one or more processors/processor cores, ASICs, microcontrollers, or programmable-logic devices.

Memory subsystem 104 includes one or more devices, circuits, hardware modules, and/or computer-readable storage mediums for storing code and/or data for use by processing subsystem 102 and/or other subsystems in electronic device 100, as well as for controlling access to the code and/or data. For example, memory subsystem 104 can include, but is not limited to, DRAM, flash memory, and/or other types of memory.

In some embodiments, memory subsystem 104 includes some or all of a memory hierarchy that comprises an arrangement of one or more caches coupled to a memory in electronic device 100. In these embodiments, one or more of the caches in the memory hierarchy can be located in processing subsystem 102. In addition, in some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can store more recently and/or frequently accessed code and/or data, while the mass-storage device stores less recently and/or less frequently accessed code and/or data.

Secondary processing subsystem 106 includes one or more devices, circuits, hardware modules, and/or computer-readable storage mediums configured for performing computational operations. For example, secondary processing subsystem 106 can be a graphics processing unit (GPU), a general-purpose GPU (GPGPU), a processor/processor core (e.g., in a CPU), and/or another type of embedded processor that includes one or more processors/processor cores, pipelines, ASICs, microcontrollers, and/or programmable-logic devices.

Figure 2:
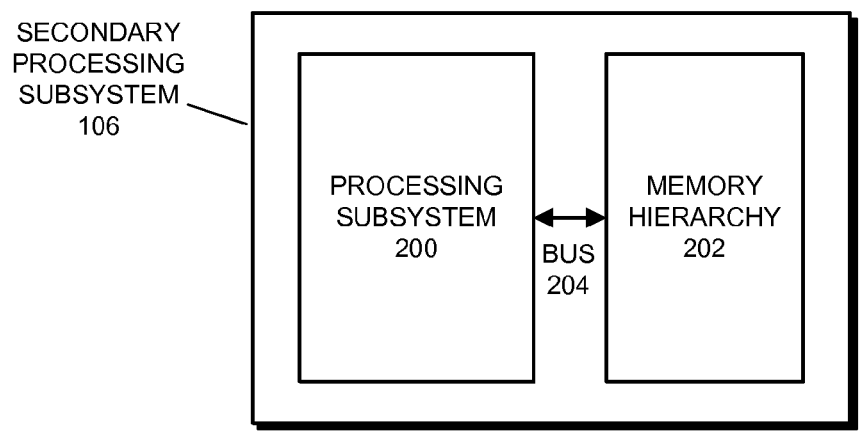
FIG. 2 presents a block diagram illustrating a secondary processing subsystem in accordance with some embodiments.

As can be seen in FIG. 2, which presents an expanded view of some embodiments of secondary processing subsystem 106, secondary processing subsystem 106 comprises processing subsystem 200 and memory hierarchy 202. Processing subsystem 200 comprises one or more processing mechanisms for performing computational operations (e.g., processor cores, pipelines, etc.). Memory hierarchy 202 comprises an arrangement of one or more separate memory circuits (e.g., semiconductor memories, etc.) that store instructions and/or data for processing subsystem 200, and that can be explicitly managed by processing subsystem 200 and/or other mechanisms in secondary processing subsystem 106 (not shown).

In some embodiments, secondary processing subsystem 106 is a GPU/GPGPU that performs computational operations related to the rendering of graphical data for display by a display subsystem (not shown). In some embodiments, secondary processing subsystem 106 is a computational device that performs one or more other operations in the system (e.g., an additional processor/processor core (e.g., in a CPU) a media processor, a system maintenance processor, a network processor, a controller, an embedded processor, etc.).

Although secondary processing subsystem 106 is referred to as "secondary" in this description, this language is simply to clarify this description and does not necessarily limit the functions performed by secondary processing subsystem 106 with respect to processing subsystem 102 and/or any other subsystem in electronic device 100. For example, in some embodiments, secondary processing subsystem 106 comprises one or more CPU/cores/pipelines that can be configured (e.g., by executing program code) to perform operations similar to those performed by processing subsystem 102. Generally, secondary processing subsystem 106 can be any type of processing subsystem that provides one or more mechanisms for using the address spaces herein described for handling accesses to memory.

In some embodiments, secondary processing subsystem 106 can perform computational operations offloaded from processing subsystem 102, thereby freeing processing subsystem 102 to perform other computational operations. In these embodiments, secondary processing subsystem 106 can be programmed using programming code in an appropriate programming language (e.g., OpenCL, CUDA, etc.) to perform these operations for processing subsystem 102. For example, in some embodiments, secondary processing subsystem 106 can execute compiled program code 306, which causes secondary processing subsystem 106 to perform operations from processing subsystem 102, as is explained in more detail below.

Bus 108 is coupled between processing subsystem 102 and memory subsystem 104 and bus 108 is coupled between processing subsystem 102 and secondary processing subsystem 106. Busses 108 and 110 can be electrical, optical, and/or electro-optical connections used to communicate between processing subsystem 102 and memory subsystem 104 and secondary processing subsystem 106, respectively.

Although shown as separate subsystems in FIG. 1, in some embodiments, some or all of a given subsystem can be integrated into one or more of the other subsystems in electronic device 100. For example, as described above, some or all of memory subsystem 104 can be included in processing subsystem 102. In addition, or alternatively, some or all of secondary processing subsystem 106 can be included in processing subsystem 102.

Electronic device 100 can be, or can be incorporated into, many different types of electronic devices. Generally, these electronic devices include any device that can perform the operations herein described. For example, electronic device 100 can be part of a desktop computer, a laptop computer, a server, a media player, an appliance, a subnotebook/netbook, a tablet computer, a smart phone, a network appliance, a set-top box, a toy, a controller, or another device.

Although specific components are used to describe electronic device 100, in some embodiments, different components and/or subsystems may be present in electronic device 100. For example, electronic device 100 may include one or more additional processing subsystems 102, memory subsystems 104, and/or secondary processing subsystems 106. Alternatively, one or more of the subsystems may not be present in electronic device 100. Moreover, in some embodiments, electronic device 100 may include one or more additional subsystems that are not shown in FIG. 1. For example, electronic device 100 can include, but is not limited to, a display subsystem, a networking subsystem, a data collection subsystem, an audio subsystem, and/or an input/output (I/O) subsystem.

Compiler

Figure 3:
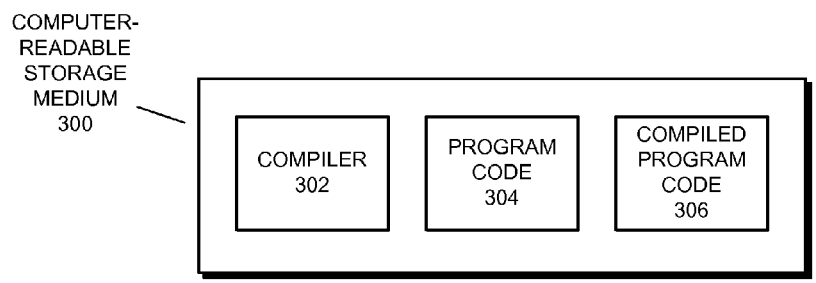
FIG. 3 presents a block diagram illustrating a computer-readable storage medium in accordance with some embodiments.

FIG. 3 presents a block diagram illustrating a computer-readable storage medium 300 (e.g., which can be included in memory subsystem 104) that comprises a compiler 302, program code 304, and compiled program code 306 in accordance with some embodiments. During operation, processing subsystem 102 can execute compiler 302, which compiles program code 304 into compiled program code 306. In compiled program code 306, one or more pointers can comprise metadata that can be used to determine an address space to which the pointers point. Compiled program code 306 can then be executed by secondary processing subsystem 106.

In some embodiments, program code 304 is written in a programming language that can be compiled into compiled program code 306 that is to be executed by a secondary processing subsystem 106 (e.g., OpenCL, OpenCL C++, CUDA, etc.). In these embodiments, program code 304 (and hence compiled program code 306) can comprise one or more instructions that cause secondary processing subsystem 106 to offload one or more computational operations from processing subsystem 102. In other words, compiled program code 306, when executed by secondary processing subsystem 106, can cause secondary processing subsystem 106 to undertake one or more computational operations on behalf of processing subsystem 102 to lessen the computational load on processing subsystem 102. For example, in some embodiments, secondary processing subsystem 106 includes circuits/processors that are particularly suited for performing simultaneous instruction multiple data (SIMD) and/or vector operations. In these embodiments, upon executing compiled program code 306, secondary processing subsystem 106 can be configured to accept SIMD and/or vector operations from processing subsystem 102, perform the operations, and return the results to processing subsystem 102, thereby avoiding the need for processing subsystem 102 to perform these operations itself.

Although computer-readable storage medium 300 is described as an example, in some embodiments, some or all of compiler 302, program code 304, and/or compiled program code 306 can be stored in separate computer-readable storage mediums. For example, in some embodiments, a copy of program code 304 is stored in memory subsystem 104, and a copy of compiled program code 306 is stored in memory hierarchy 202. As another example, program code 304 can be stored in a memory subsystem in a programmer's electronic device 100 (e.g., desktop computer, server, laptop, etc.), and copies of compiled program code 306 can be sold/distributed to users to be stored in a computer-readable storage medium on the user's electronic device 100 (e.g., desktop computer, laptop computer, smart phone, etc.).

Aside from the operations herein described, compiler 302 performs operations known in the art for compiling programming code to generate compiled program code.

Address Spaces

Figure 4:
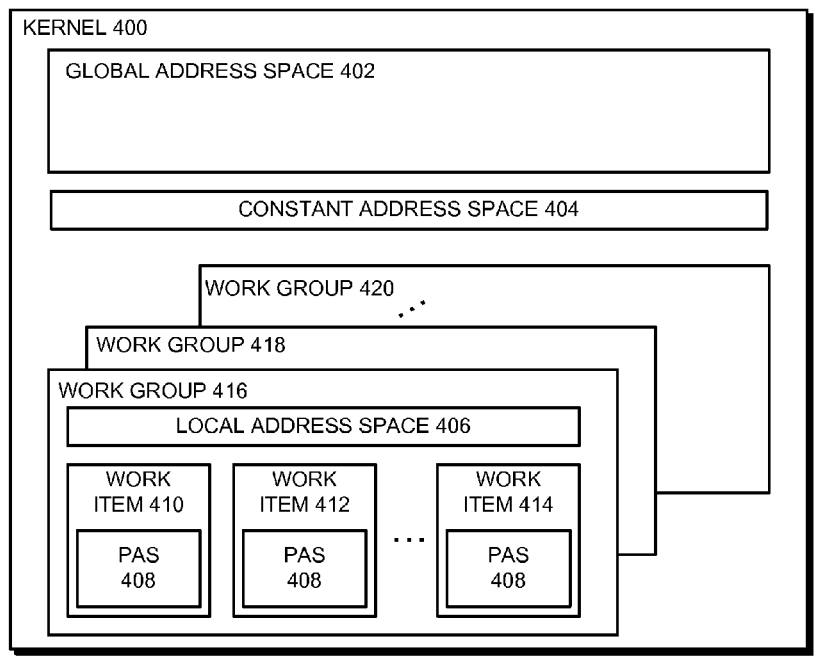
FIG. 4 presents a block diagram illustrating address spaces in accordance with some embodiments.

Some embodiments support programming languages that use multiple disjoint address spaces (e.g., OpenCL, CUDA, etc.) to control accesses to explicitly-managed memory hierarchy 202 in secondary processing subsystem 106. For example, in some embodiments, these address spaces comprise a global address space, a local address space, a constant address space, and a private address space. FIG. 4 presents a block diagram of global address space 402, constant address space 404, local address space 406, and private address spaces ("PAS") 408 in each of work items 410-414 in kernel 400 in accordance with some embodiments. Generally, each of the address spaces 402-408 includes a group of memory addresses in memory hierarchy 202 that is separate and does not overlap the other address spaces, i.e., is disjoint.

The address spaces in FIG. 4 are associated with, and accessible to, various work items in kernel 400 (which can be executed by secondary processing subsystem 106) in accordance with a scope of the address space. For example, global address space 402 and constant address space 404 include addresses for portions of memory hierarchy 202 that are (globally) visible to all work groups 416-420 (and, hence, to the work items in each work group, such as work items 410-414 in work group 416). In addition, local address space 406 includes a portion of memory hierarchy 202 that is visible to all work items 410-414 in the work group 416, and private address space 408 includes a portion of memory hierarchy 202 that is visible to the corresponding work item 410-414.

Some embodiments also support programming languages that use a generic address space. Generally, the generic address space is used for pointers for which secondary processing subsystem 106 determines an address' disjoint address space at runtime (or "dynamically") as compiled program code is executed. Generic address spaces enable dynamic casting between generic and non-generic address spaces that is similar to the dynamic subtyping found in objected oriented programming languages.

Note that, although FIG. 4 presents example address spaces, some embodiments are not limited to these address spaces. Generally, some embodiments can update metadata for pointers in compiled program code 306 to enable the resolution of address spaces for various arrangements and types of address spaces.

Compilation

As briefly described above, as compiled program code 306 is generated during a compilation operation, a compiler 302 in some embodiments updates metadata associated with pointers with address space information. The metadata can then be used when compiled program code 306 is subsequently executed (e.g., at runtime) to enable a determination of an address space to which the pointer points (e.g., the one of address spaces 402-408 to which the pointer points).

In some embodiments, the update of the metadata for pointers can occur at any stage of a compilation process during which the requisite information about program structure (address spaces, pointers, etc.) is available to compiler 302. For example, in some embodiments, the update of metadata occurs in a compiler front-end, along with syntactic analysis and generation of intermediate code, or in the compiler back-end, along with other optimization and/or code generation operations performed on the intermediate code generated in the compiler front-end.

Figure 5:
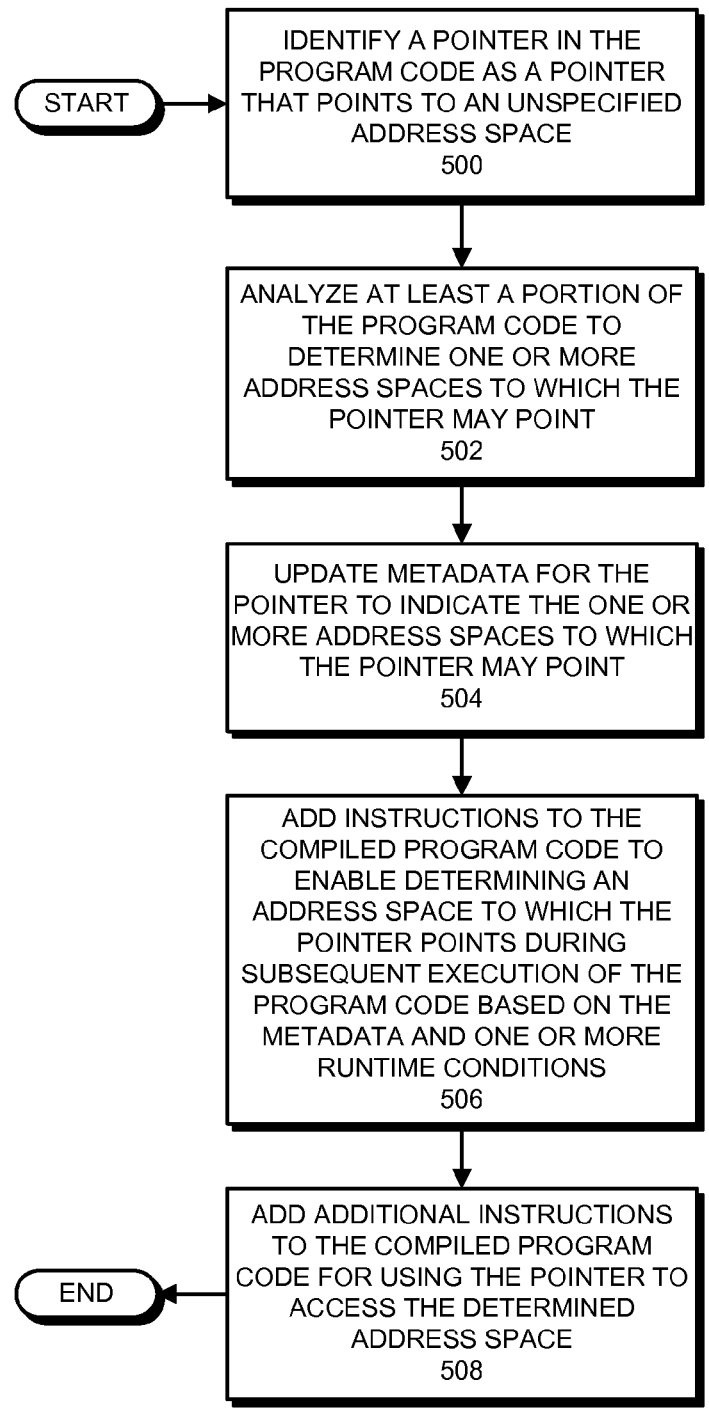
FIG. 5 presents a flowchart illustrating a process for compiling program code to generate compiled program code in accordance with some embodiments.

FIG. 5 presents a flowchart illustrating a process for compiling program code 304 to generate compiled program code 306 in accordance with some embodiments. Note that the operations in FIG. 5 are presented as a general example of some functions that may be performed by the described embodiments. The operations performed by some embodiments include different operations and/or operations that are performed in a different order.

The process shown in FIG. 5 starts when, during a compilation operation, compiler 302 (which can be executed by, e.g., processing subsystem 102) identifies a pointer in program code 304 that points to an unspecified address space (step 500). More specifically, during the identification operation, compiler 302 can first find the pointer in program code 304. For example, compiler 302 can search through program code 304 (or an intermediate representation of program code 304 generated during the compilation process) to find pointers. Compiler 302 can then attempt to resolve an address space to which the pointer points using information in the pointer. For each pointer whose address space can be resolved in this way, compiler 302 can halt the processing of the pointer, leaving the pointer without metadata (the metadata being unnecessary when the address space can be resolved). However, when an address space cannot be resolved for the pointer at compile-time, compiler 302 can identify the pointer as being a pointer that points to the unspecified address space. For example, compiler 302 can identify a pointer as pointing to the generic address space and/or can identify different instances of a pointer in program code 304 as pointing to two or more different address spaces, such as in the following example:

```
kernel void bar(global int *g, local int *l)
{
  generic int * tmp;
  if (get_global_id(0) % 2)
  {
    tmp = g;
  }
  else
  {
    tmp = l;
  }
}
```

As can be seen in this example, the address space for tmp is generic, and different instances of tmp are set equal to a pointer from a local (l) and a global (g) address space, respectively. Compiler 302 can therefore determine that tmp is a pointer to an unspecified address space because tmp: (1) is a pointer to a generic address space, and (b) different instances of tmp can point to either the global or the local address space.

Compiler 302 next analyzes at least a portion of program code 304 to determine one or more address spaces to which the pointer may point (step 502). For example, compiler 302 can analyze program code 304 to determine one or more operations in which the pointer is (directly) used that indicate an address space to which the pointer may point. Using the example from above, compiler 302 may determine that different instances of the pointer tmp are set equal to a pointer from both a local (l) and a global (g) address space. As another example, compiler 302 can analyze operations that do not directly use the pointer, but that are related to the operations in which the pointer is used that indicate an address space to which the pointer may point, as the following example illustrates:

```
kernel void bar(global int *g, local int *l)
{
  generic int * tmp;
  generic int * zip;
  if (get_global_id(0) % 2)
  {
    zip = g;
  }
  else
  {
    zip = l;
  }
  tmp = zip;
}
```

In this example, compiler 302 can determine that different instances of zip are set equal to a pointer from a local (l) and a global (g) address space, respectively, and that tmp is set equal to zip. Compiler 302 can then determine that tmp may point to either the global or the local address space.

Compiler 302 then updates metadata for the pointer to indicate the one or more address spaces to which the pointer may point (step 504). Generally, the metadata can include any information that enables a determination of an address space to which the pointer points during subsequent execution of compiled program code 306. In some embodiments, the metadata (which may be called a "predicate") is contained in the pointer itself, is stored in a table in compiled program code 306, and/or is otherwise located in program code (e.g., as an annotation near the pointer in compiled code, etc.) or a data structure (e.g., a separate file) associated with compiled program code 306.

Figure 6A:
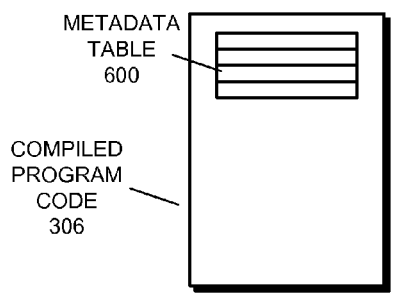
FIGS. 6A-6B present examples of metadata for pointers in accordance with some embodiments.
Figure 6B:
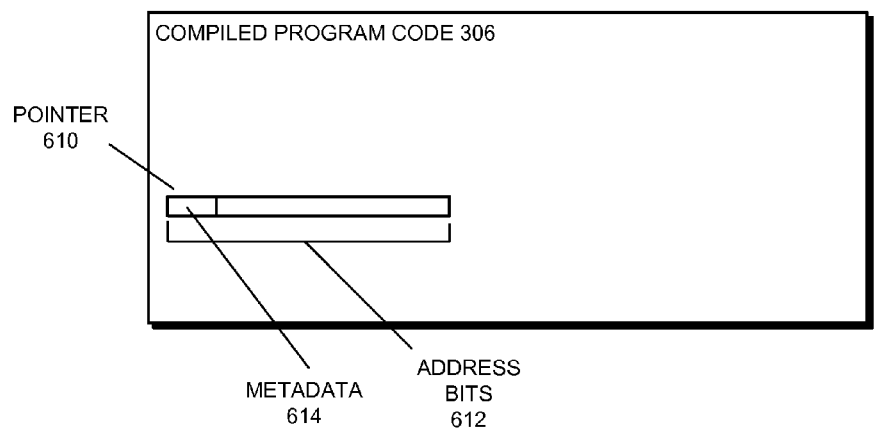

FIGS. 6A-6B present examples of metadata for pointers in accordance with some embodiments. Note that, although the embodiments shown in FIG. 6A-6B can be used separately, in some embodiments, some combination of FIGS. 6A-6B can be used.

As shown in FIG. 6A, in some embodiments, compiled program code 306 includes a metadata table 600 that stores metadata for at least some of the pointers in compiled program code 306. As described above, the information in metadata table 600 can include any type of information that can be used by secondary processing subsystem 106 for determining the address spaces to which a pointer may point when executing compiled program code 306. For example, the information can include a value representing each address space to which the pointer may point, a value representing a possibility (e.g., a percentage) that the pointer points to each address space to which the pointer may point, an identifier for the pointer and/or the instance of the pointer (e.g., a program counter, a pointer name, a program scope indication, etc.), and/or other information.

As shown in FIG. 6B, in some embodiments, compiled program code 306 includes a pointer 610 (along with other compiled program code). Pointer 610 includes a set of address bits 612, a portion of which (e.g., a given N bits of a M-bit pointer address, where N<M) can be used to store metadata 614 that indicates the one or more address spaces to which the pointer may point. In these embodiments, secondary processing subsystem 106 may be configured not to use all of address bits 612 in pointer 610 to point to locations in memory hierarchy 202 (i.e., may operate using pointers that are shorter than the maximum pointer length supported by secondary processing subsystem 106). Thus, these embodiments may use a subset of N (e.g., 2, 4, etc.) bits from the M (e.g., 64, 32, etc.) bits in pointer 610 to store metadata 614 (i.e., unused address bits may be repurposed for storing the metadata for the pointer). In these embodiments, metadata 614 may therefore fit within an existing pointer.

Returning to FIG. 5, compiler 302 can then add one or more instructions to compiled program code 306 for determining an address space to which the pointer points during subsequent execution of compiled program code 306 based on the metadata and one or more runtime conditions (step 506). As one example, compiler 302 can add one or more instructions that analyze at least a portion of compiled program code 306 and/or runtime state of secondary processing subsystem 106, processing subsystem 102, and/or electronic device 100 to determine an address space to which a given instance of the pointer is directed. This can include instructions that check one or more runtime pointer/variable and/or register/memory values, compute one or more conditional results based on runtime values (e.g., comparisons, logical operations, etc.), analyze a runtime flow of the program, compare one or more portions of runtime state with the metadata for the instance of the pointer, and/or perform other operations to determine an address space to which a pointer is directed.

In some embodiments, compiler 302 can add one or more indicator variables to compiled program code 306 to enable the determination of an address space to which a pointer is directed using the above-described instructions. Each indicator variable can be used to store a representation (e.g., a numerical value, a string, a vector, etc.) of some portion of a dynamic/runtime state of compiled program code 306 and/or secondary processing subsystem 106, processing subsystem 102, and/or electronic device 100 to enable the analysis of a given instance of a pointer's address space. In these embodiments, compiler 302 may also add instructions to corresponding locations of compiled program code 306 to set or update the value of the indicator variables based on one or more of the program flow (e.g., which branch was taken in a conditional, whether one or more conditions have occurred, etc.), the runtime state of the system (e.g., has a register been written to, etc.), and/or other operations that indicate an address space to which the corresponding instance of the pointer is directed.

Next, compiler 302 can add one or more additional instructions to compiled program code 306, the additional instructions using the pointer to access the determined address space to which the pointer points (step 508). Generally, these instructions can comprise any instruction or combination of instructions that enable secondary processing subsystem 106 to perform some operation using the pointer and the determined address space. In some embodiments, these instructions comprise: (1) a memory access instruction configured to access each address space to which the pointer may point, and (2) one or more conditional instructions that control which of the memory access instructions is used to access the determined address space using the pointer. For example, assuming that the address spaces to which the pointer may point include at least a global address space and a local address space, the programming language in which program code 304 is written can include separate instructions for performing memory accesses (reads and writes) for each of the address spaces, such as a "read global address space" instruction and a "read local address space" instruction. In these embodiments, the one or more conditional instructions determine which of the memory access instructions is to be used based on the outcome of the address space determination for the corresponding instance of the pointer (i.e., the determination performed by the instructions from step 506).

Program Code Execution

Figure 7:
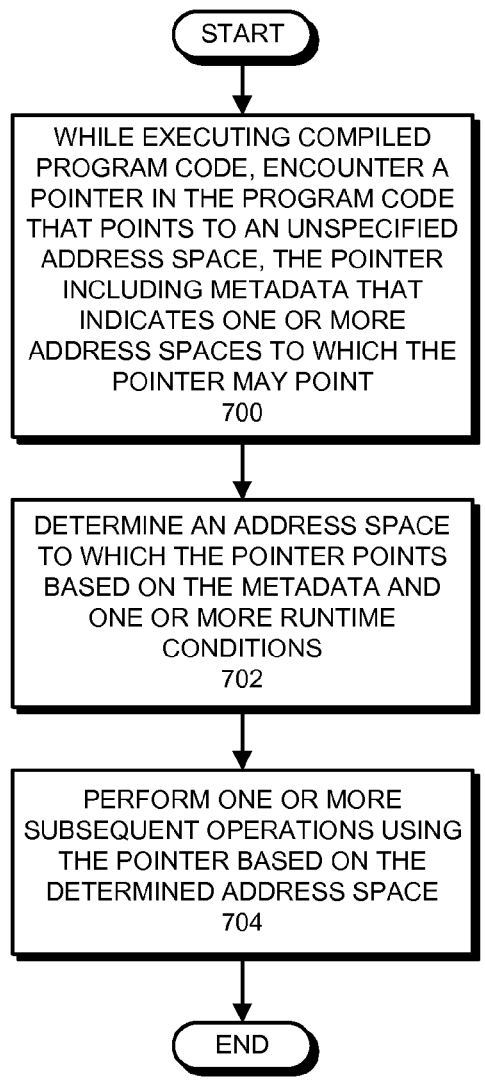
FIG. 7 presents a flowchart illustrating handling a pointer while executing program code in accordance with some embodiments.

FIG. 7 presents a flowchart illustrating handling a pointer while executing program code in accordance with some embodiments. Note that the operations in FIG. 7 are presented as a general example of some functions that may be performed by the described embodiments. The operations performed by some embodiments include different operations and/or operations that are performed in a different order.

As shown in FIG. 7, the operations start when, while executing compiled program code 306 (e.g., program code compiled during a compilation operation in which the operations shown in FIG. 5 are a portion), secondary processing subsystem 106 encounters a pointer in compiled program code 306 that points to an unspecified address space, the pointer including metadata that indicates one or more address spaces to which the pointer may point (step 700). Recall that the metadata may be included in the pointer itself, in a metadata table 600 included in compiled program code 306, and/or otherwise located in program code (e.g., as an annotation near the pointer in compiled code, etc.) or a data structure (e.g., a separate file) associated with compiled program code 306.

Secondary processing subsystem 106 then determines an address space to which the pointer points based on the metadata and one or more runtime conditions (step 702). When determining the address space to which the pointer points based on the metadata and the one or more runtime conditions, secondary processing subsystem 106 can first collect information about the one or more runtime conditions, the information indicating at least one candidate address space to which the pointer may point. Performing the collection operation can comprise executing one or more of the instructions added to compiled program code 306 in step 506 of FIG. 5 (possibly along with using indicator variables) to determine the candidate address space (where a candidate address space is an address space to which the pointer could point). Secondary processing subsystem 106 then uses the collected information and the metadata to determine an address space to which the pointer points. For example, secondary processing subsystem 106 could perform one or more comparison operations, logical operations, and/or other operations to determine if the candidate address space is an address space to which the pointer was determined (in step 502) to point. Performing the determination operation can comprise executing one or more of the instructions added to compiled program code 306 in step 506 of FIG. 5 (possibly along with using indicator variables).

In some embodiments, collecting the information about the one or more runtime conditions comprises collecting information from operations that use the pointer and/or operations related to operations that use the pointer that do not directly use the pointer. Recall the examples from above, where the tmp pointer was set equal to a pointer to a known address space, and where the tmp pointer was set equal to a second pointer (the zip) pointer, and the second pointer was set equal to a pointer to a known address space. Secondary processing subsystem 106 can collect the information from these types of operations and/or from other operations that indicate an address space for the pointer.

Secondary processing subsystem 106 then performs one or more subsequent operations using the pointer based on the determined address space (step 704). In these embodiments, when performing the one or more subsequent operations using the pointer, secondary processing subsystem 106 can execute the additional instructions placed in the program code in step 508 of FIG. 5. For example, secondary processing subsystem 106 can receive a set of possible memory accesses that comprises a separate memory access for each of the one or more address spaces to which the pointer may point and one or more conditional instructions that determine which of the memory access instructions is to be used based on the outcome of the address space determination for the corresponding instance of the pointer.

Although embodiments are described that use components (e.g., processing system 102, secondary processing subsystem 106, etc.) in electronic device 100 for performing both the compilation operation (FIG. 5) and the execution operation (FIG. 7), the described embodiments are not required to use the same electronic device 100 for performing all operations. Generally, any electronic device that can perform the operations herein described can be used in either or both of the compilation and execution operations. For example, in some embodiments, a first electronic device (e.g., a computer system) is used for performing the compilation operation, and a second, different electronic device (e.g., a laptop) is used for performing the execution operation.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling a pointer while executing program code, comprising:
by an electronic device:
encountering a pointer in the program code that points to an unspecified address space, wherein the pointer includes metadata that indicates one or more address spaces to which the pointer may point; and
collecting information about one or more runtime conditions based on at least one of operations that use the pointer and operations related to operations that use the pointer that do not directly use the pointer, wherein the information indicates at least one candidate address space to which the pointer may point; and
using the collected information and the metadata to determine an address space to which the pointer points.

2. The method of claim 1, further comprising:
performing one or more subsequent operations using the pointer based on the determined address space.

3. The method of claim 2, wherein performing the one or more subsequent operations using the pointer based on the determined address space comprises:
receiving a set of possible memory accesses that comprises a separate memory access for each of the one or more address spaces to which the pointer may point;
determining a memory access to be performed using the pointer from the set of possible memory accesses based on the determined address space; and
performing the determined memory access using the pointer.

4. The method of claim 1, further comprising:
receiving the program code, wherein the metadata that indicates one or more address spaces to which the pointer may point was added during a generation of the program code based at least in part on an analysis of the program code.

5. A non-transitory computer-readable storage medium containing instructions that, when executed by an electronic device with computing capabilities, cause the electronic device to perform a method for handling a pointer while executing program code, the method comprising:
encountering a pointer in the program code that points to an unspecified address space, wherein the pointer includes metadata that indicates one or more address spaces to which the pointer may point;
collecting information about one or more runtime conditions based on at least one of operations that use the pointer and operations related to operations that use the pointer that do not directly use the pointer, wherein the information indicates at least one candidate address space to which the pointer may point; and
using the collected information and the metadata to determine an address space to which the pointer points.

6. The computer-readable storage medium of claim 5, wherein the method further comprises:
performing one or more subsequent operations using the pointer based on the determined address space.

7. The computer-readable storage medium of claim 6, wherein performing the one or more subsequent operations using the pointer based on the determined address space comprises:
receiving a set of possible memory accesses that comprises a separate memory access for each of the one or more address spaces to which the pointer may point;
determining a memory access to be performed using the pointer from the set of possible memory accesses based on the determined address space; and
performing the determined memory access using the pointer.

8. The computer-readable storage medium of claim 5, wherein the method further comprises:
receiving the program code, wherein the metadata that indicates one or more address spaces to which the pointer may point was added during a generation of the program code based at least in part on an analysis of the program code.

9. An electronic device that handles a pointer while executing program code, comprising:
at least one processing subsystem; and
a memory subsystem;
wherein the electronic device:
encounters a pointer in the program code that points to an unspecified address space, wherein the pointer includes metadata that indicates one or more address spaces to which the pointer may point; and
collects information about one or more runtime conditions based on at least one of operations that use the pointer and operations related to operations that use the pointer that do not directly use the pointer, wherein the information indicates at least one candidate address space to which the pointer may point; and
uses the collected information and the metadata to determine an address space to which the pointer points.

10. The electronic device of claim 9, wherein the electronic device further:
performs one or more subsequent operations using the pointer based on the determined address space.

11. The electronic device of claim 10, wherein performing the one or more subsequent operations using the pointer based on the determined address space comprises:
receiving a set of possible memory accesses that comprises a separate memory access for each of the one or more address spaces to which the pointer may point;

determining a memory access to be performed using the pointer from the set of possible memory accesses based on the determined address space; and performing the determined memory access using the pointer.

12. The electronic device of claim 9, wherein the electronic device further:

receives the program code, wherein the metadata that indicates one or more address spaces to which the pointer may point was added during a generation of the program code based at least in part on an analysis of the program code.

* * * * *